United States Patent
Kao

[11] Patent Number: 5,860,466
[45] Date of Patent: Jan. 19, 1999

[54] WINDSHIELD SHELTER

[76] Inventor: Nien Tsu Tim Kao, 13018 Park View Dr., Baldwin Park, Calif. 91706

[21] Appl. No.: 595,808

[22] Filed: Feb. 2, 1996

[51] Int. Cl.[6] .......................................................... B60J 3/02
[52] U.S. Cl. .................................... 160/370.22; 160/23.1; 160/273.1; 160/370.23
[58] Field of Search .......................... 160/370.21, 370.22, 160/370.23, 23.1, 290.1, 273.1, 271, 268.1, 270, 272; 296/97.8

[56] References Cited

U.S. PATENT DOCUMENTS

| | | | |
|---|---|---|---|
| 2,519,638 | 8/1950 | Marzo | 160/272 X |
| 2,726,114 | 12/1955 | Jacobi et al. | 160/290.1 X |
| 4,442,881 | 4/1984 | Monteath et al. | 160/370.22 X |
| 4,736,980 | 4/1988 | Eubanks | 160/370.22 X |
| 4,823,859 | 4/1989 | Park | 160/370.22 |
| 4,874,026 | 10/1989 | Worrall | 160/370.22 X |
| 4,886,104 | 12/1989 | Eldridge | 160/370.23 |
| 4,921,299 | 5/1990 | Herrick | 160/370.22 X |
| 5,117,889 | 6/1992 | Coe | 160/134 |
| 5,176,194 | 1/1993 | Chigusa | 160/273.1 |
| 5,211,442 | 5/1993 | Shikano | 160/370.23 X |
| 5,344,206 | 9/1994 | Middleton | 160/370.22 X |

Primary Examiner—David M. Purol
Attorney, Agent, or Firm—David & Raymond; Raymond Y. C. Chan

[57] ABSTRACT

A windshield shelter system for shading a windshield of a vehicle includes a shelter device, a pair of opposite guide tracks and a plurality of guiders. The shelter device, which is firmly mounted on a first side of the windshield, includes an elongated shelter sheet and a housing for receiving the shelter sheet therein. The elongated shelter sheet has a size adapted to cover the entire window area of the windshield. The pair of opposite guide tracks are firmly attached respectively along a second side and a third side opposing the second side of the windshield. Each of the guide tracks has a longitudinal guiding groove facing each other. The pair of guiding grooves are positioned along the pair of guide tracks respectively for guiding transverse movements of the guiders. The plurality of guiders are spacedly mounted along two opposite edges of the elongated shelter sheet. The guiders of the elongated shelter sheet are perpendicularly inserted into and slid along the corresponding guiding grooves of the pair of opposite guide tracks along the second and third sides of the elongated shelter sheet. Thereby, transversely moving the elongated shelter sheet, which is gathered within the housing while not used, toward an opposing fourth side of the windshield can allow the elongated shelter sheet to cover the entire area of the windshield, wherein the transverse movement of the shelter sheet is guided by sliding the guiders along the guiding grooves of the guide tracks.

5 Claims, 4 Drawing Sheets

WINDSHIELD SHELTER

BACKGROUND OF THE PRESENT INVENTION

The present invention relates to windshield shelter, and more particularly to an automobile windshield shelter which can be installed to both the front and rear automobile windshields for covering the entire window area.

Most drivers experience that when their vehicles are parked outdoor in sunshiny day time, the sun radiation may directly shine on the vehicles. The heat conducted to the vehicles' interiors raises the interior temperature and may damage the electronic equipment on the front dash board. The airtight interior of the vehicle will become hot and stuffy for re-entrance and, especially, the steering wheel will become hand burning. The driver has to open the doors first to enable air circulating for a while until the interior temperature decreases, and then starts the engine to run the air conditioning before the driver and the passengers get in the vehicle. It wastes a lot of time so that some impatient people may rush in the vehicle and drive. The extremely hot interior may affect the driving attention of the driver. Moreover, the burning steering wheel is too hot to handle.

Two common devices are currently used to solve the aforesaid problems, which are a cardboard shelter and a twisted shelter for covering the front windshield of a vehicle. The cardboard shelter is made of hard cardboard paper and is foldable. The twisted shelter is made of nyloncloth with two circular springs mounted therein and is also foldable by twisting. Such conventional shelters are very troublesome that the driver has to unfold and extend it to cover the entire front windshield while parking and has to refold and remove it from the front windshield before driving. The folding and unfolding, as well as the installing and removing operations are troublesome and time consumable since the interior space of a vehicle is too narrow for operating a shelter as large as the windshield. Moreover, we need to reserve some room for storing up the conventional extensible shelter when it is not used. The most essential shortcoming of such conventional extensible shelters is that, since the space between the front windshield and the steering wheel and the rear view mirror is so narrow, every time when they are extended to cover or removed form the windshield, the rear view mirror may be bumped to displace from its original position. The driver has to reset the rear view mirror before driving.

U.S. Pat. No. 5,197,503 disclosed a motorcar sun-shade which comprises a supporting frame assembly and a covering supported by the frame for covering the top portion of a motorcar. Since such configuration consists of many parts and is very troublesome to operate, it is not popular in the market.

Conventional continuously unfurlable car window shade, such as U.S. Pat. No. 5,036,898, is used for front windshield shading. The driver has to install the apparatus and pull the elastic shade cloth out to cover a portion of the windshield every time. This apparatus has the following shortcomings that it can only cover a portion of the windshield but not the entire area and the apparatus is merely mounted on the windshield by sucking elements.

SUMMARY OF THE PRESENT INVENTION

It is an object of the present invention to provide a windshield shelter which is convenient in operation, both extending to cover the whole windshield while parking and gathering aside for the viewing while driving.

It is still an object of the present invention to provide a windshield shelter which is adapted to install on the front windshield and/or the rear windshield.

It is yet an object of the present invention to provide a windshield shelter which can cover the entire windshield area so as to shade any direct sunshine via the windshield.

It is another object of the present invention to provide a windshield shelter in which the extending or gathering of the shelter sheet is guided by means of a pair of guide tracks so as to provide smooth and fast movement of the shelter sheet.

DETAILED DESCRIPTION OF THE PREFERRED EMBODIMENT

Figure 1:
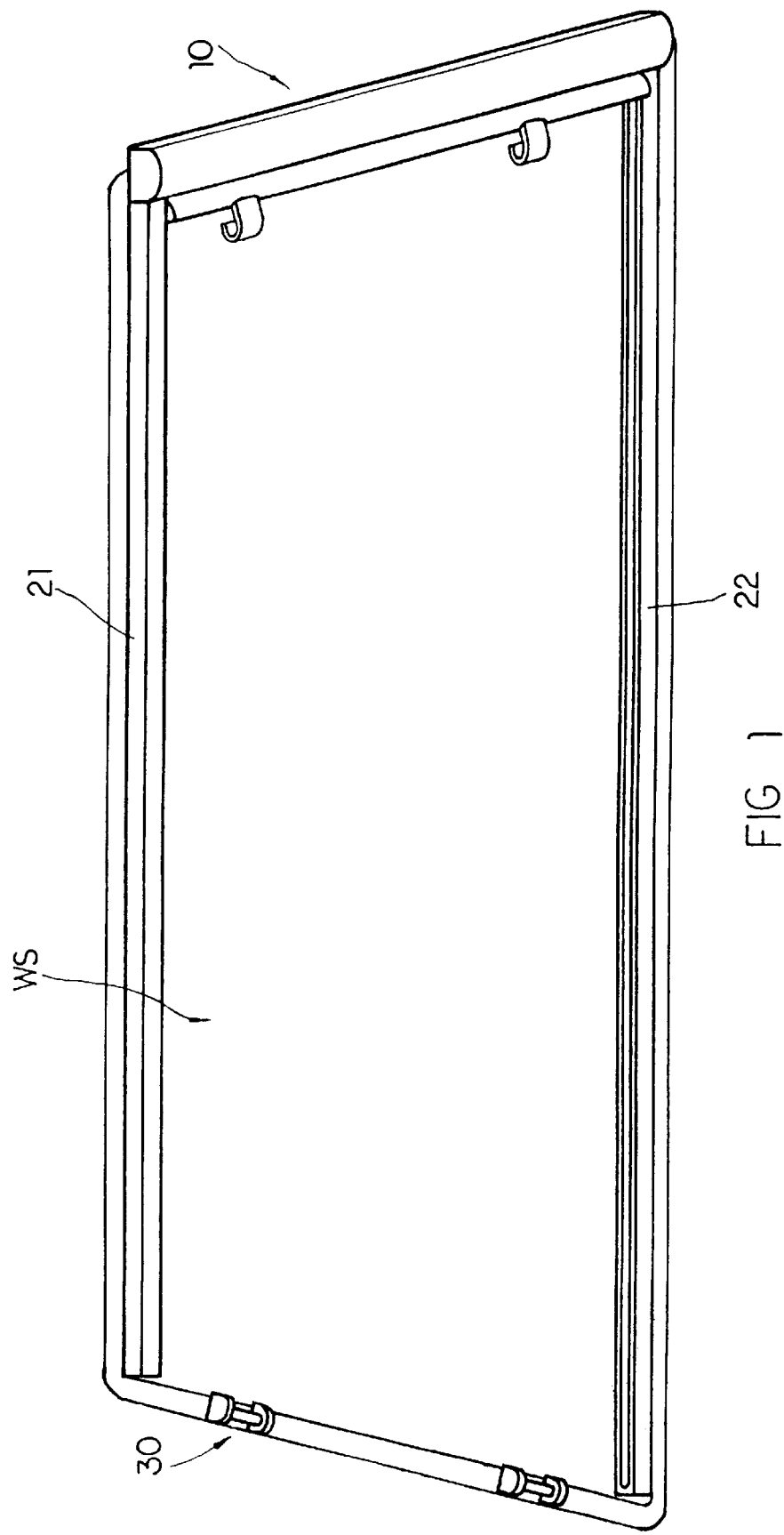
FIG. 1 is a perspective view of a windshield shelter according to a first preferred embodiment of the present invention, showing the relative positions of a shelter device, a pair of opposite guide tracks, and a fastening means as affixed on a front windshield of an automobile respectively.
Figure 2:
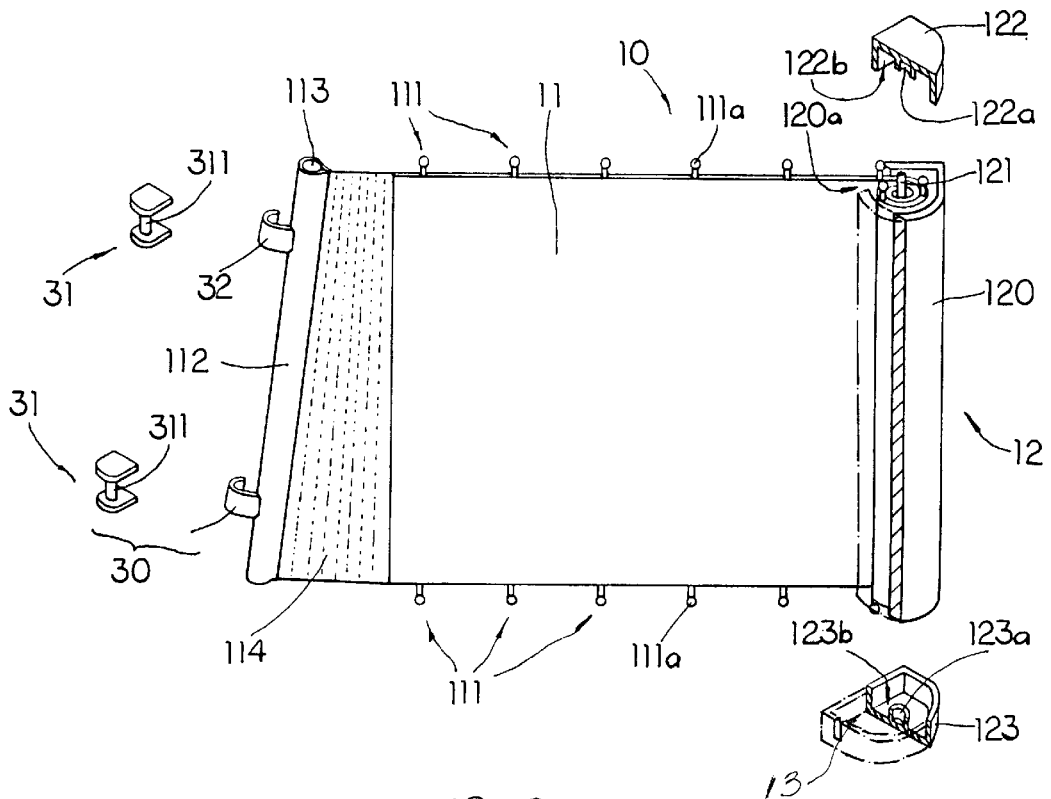
FIG. 2 is a perspective view of a windshield shelter according to the above first preferred embodiment of the present invention, illustrating a best mode with its rewinding device, elongated shelter sheet, elastic band, ball-headed guiders and fastening means.
Figure 3:
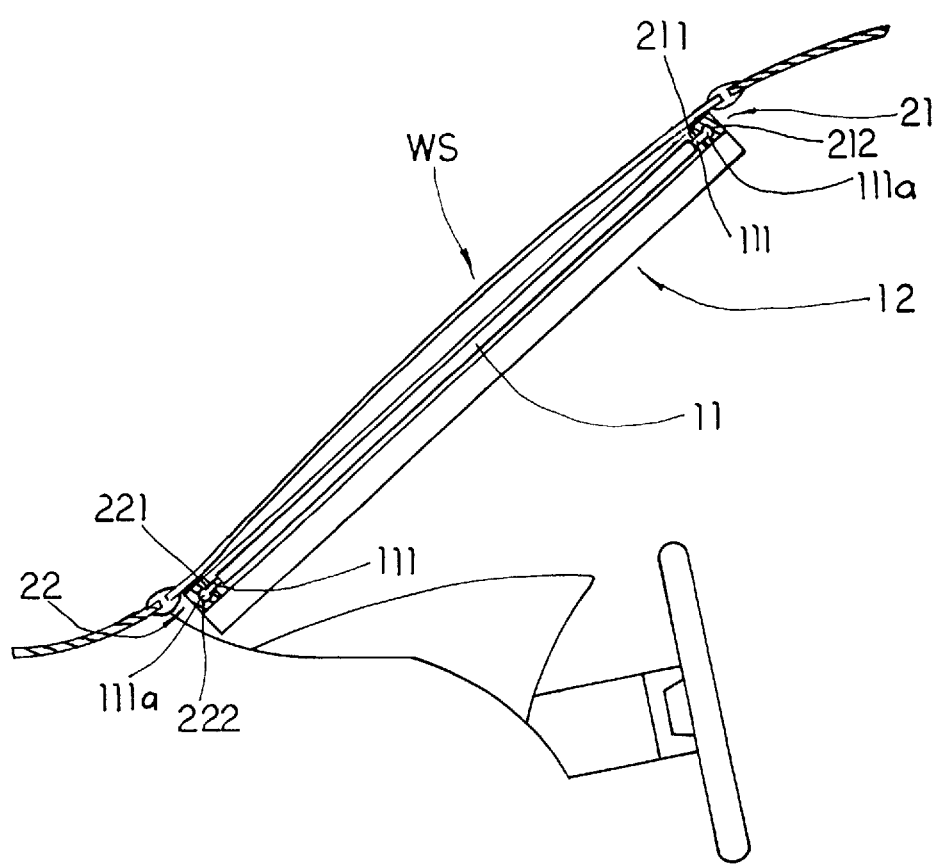
FIG. 3 is an end view of a windshield shelter installed on a front windshield guide track according to the above first preferred embodiment of the present invention, showing the relationship between the guide tracks and the guiders.

Referring to FIGS. 1 to 3, a first preferred embodiment of the present invention of a windshield shelter system for shading a windshield WS of a vehicle comprises a shelter device 10, a pair of opposite guide tracks 21, 22 and a fastening means 30.

The shelter device 10, which is firmly mounted on a first side of the windshield WS, comprises an elongated shelter sheet 11 and a housing 12 for receiving and gathering the shelter sheet therein when the elongated shelter sheet 11 is in a rewound position. The elongated shelter sheet 11 has a plurality of guiders 111 spacingly mounted along two opposite edges of the elongated shelter sheet 11.

The housing 12 comprises a cylindrical housing tube 120 and a rewinding device (not shown in Figures) therein for providing a retracting function with a central shaft 121. The shelter sheet 11 has a length at least equal to a longest length of the windshield WS and a height equal to or slightly smaller than a height of the windshield WS. The shelter sheet 11 has a first end edge attached to the shaft 121 and is wound around the central shaft 121 which is longer than the height of the shelter sheet 11. The housing tube 120 has a rear flat surface adapted for adhering to the flat surface of the windshield WS and a longitudinal slot 120a positioned at one side adjacent to the windshield WS for enabling a second free end edge 112 of the shelter sheet 11 to be extended out of the housing 12 via the slot 120a. The free end edge 112 of the shelter sheet 11 is bonded with a reinforcing tab 113 which has a diameter larger than a width of the slot 120a so that the free end edge 112 bonded with the tab 113 can be retained along the slot 120a to form a pulling handle of the shelter sheet 11 for stretching the shelter sheet 11 out of the housing 12 and toward an opposite fourth side of the windshield WS.

As shown in FIG. 2, the housing 12 further comprises a pair of caps 122, 123 mounted on the two ends of the housing tube 120. Each of the caps 122, 123 has a central sleeve 122a, 123a for receiving and supporting two ends of the shaft 121 respectively, so that the shaft 121 can be rotated along an axis between the two sleeves 122a, 123a. Each of the two caps 122, 123 further has a receiving chamber 122b, 123b formed around the sleeve 122a, 123a for receiving the guiders 111 while the shelter sheet 11 is rewound around the shaft 121 within the housing tube 120. Each cap 122, 123 further provides a guider mouth slot 13 therethrough at an inner side respectively for the guiders 111 to pass through during the extending and rewinding movement of the shelter sheet 11.

In accordance with the present embodiment, as shown in FIG. 1, the shelter device 10 is firmly affixed by adhering to a right side of the glass windshield WS. However, an alternative way is to firmly affixed the housing 12 of the shelter device 10 to a first side, for example the right side, of the frame of windshield WS by screwing.

Referring to FIG. 3, the pair of opposite guide tracks 21, 22 are firmly attached respectively along an opposite second and third sides of the windshield WS. Each of the guide tracks 21, 22 has a longitudinal guiding groove 211, 221. According to the present embodiment, the second and third sides are a top and bottom sides of the windshield WS. The pair of identical guide tracks 21, 22 are made of extruded plastic strips, each having a U-shape cross section. The user may cut two elongated strips according to the length of the second side and third side of the windshield WS to form the two guide tracks 21, 22 and then firmly adhere them on to the second and third sides of the windshield WS with their guiding grooves 211, 221 facing each other. According to the present embodiment, the guiding groove 211 of the top guide track 21 is affixed to the top side of the windshield WS with its guiding groove 211 facing downward and the bottom guide track 22 is affixed to the bottom side of the windshield WS with its guiding groove 221 facing upward.

The guiders 111 are attached to the top and bottom edges of the elongated shelter sheet 11. Each of the guiders 111 has a guide head 111a protruded perpendicularly to the shelter sheet 11. When the shelter sheet 11 is stretched out of the housing 12 by pulling the free end edge 112 and the tab 113 of the shelter sheet 11 toward the opposite fourth side of the windshield WS for covering the windshield WS, the guiders 111 attached to the top and bottom edges of the shelter sheet 11 are perpendicularly inserted into and slid along the guiding grooves 211, 221 of the pair of opposite guide tracks 21, 22, along the opposite edges of the elongated shelter sheet 11, respectively.

In addition, such pair of guiding grooves 211, 221 inside the pair of opposite guide tracks 21, 22 are formed along with the pair of guide tracks 21, 22 respectively for guiding the transverse movements of the guiders 111. The transverse movements of each guider 111 of the elongated shelter sheet 11 facilitates the elongated shelter sheet 11 to be fully extended to cover the entire area of the windshield WS.

According to the present first embodiment, the guide heads 111a are round ball heads. Each of the guide heads 111a has a diameter slightly smaller than the width of the guiding grooves 211, 221 of the two guide tracks 21, 22. Each of the guiding grooves 211, 221 of the pair of guide tracks 21, 22 has a bottom ball groove potion 212, 222 for receiving the ball guide heads 111a of the guiders 111, as shown in FIG. 3. Accordingly, the guiding and supporting functions of the guide tracks 21, 22 for the guiders 111 of the shelter sheet 11 will be more effective and the extending or rewinding of the shelter sheet 11 along the guide tracks 21, 22 will be more smooth.

Since most windshields have curve surfaces, in order to enable the shelter sheet 11 conforming and extending along the curvature of the curved windshield, the pair of guide tracks 21, 22 are made of elastic material, so that the guide tracks 21, 22 can be slightly bent and adhered onto the curve surface of the windshields WS. Accordingly, the shelter sheet 11 according to the present invention, which is guided by the guide tracks 21, 22 during extending across the windshield WS, can be extended along the curvature of the windshield so that the curved windshield WS can still be entirely covered by the shelter sheet 11. However, the conventional shading device can only provides a flat shading surface, which is unable to conform with the curvature of the windshield and cannot cover the entire window area of the windshield.

The fastening means 30 of the windshield shelter system comprises at least one holder 31 and at least one fastener 32. The holder 31 is mounted to the fourth side of the windshield WS opposite to the first side of the windshield, and the fastener 32 is attached to the free end edge 112 of the elongated shelter sheet 11. By means of the fastening means 30, the entirely extended shelter sheet 11 can be locked in position to cover the entire window area of the windshield WS.

In accordance with the present first embodiment, as shown in FIG. 1, there are two holders 31 mounted on an upper and a lower portion of a left side of the windshield's frame. Each of the holders 31 has a holding rod 311 positioned parallel to the windshield's surface. In addition, there are two fasteners 32 mounted on an upper and a lower portion of the tab 113 which is embedded by the free end edge 112 of the shelter sheet 11. Each of the fasteners 32 is a C-shape hook clip for buckling up the corresponding holding rod 311 of the holder 31 when the shelter sheet 11 is entirely extended. Thus, the fasteners 32 are engaged with the holders 31 for holding the fully extended shelter sheet 11 in position to cover the entire area of the windshield WS.

Most windshields have shorter top sides and longer bottom sides. According to the present first preferred embodiment, as shown in FIG. 2, the elongated shelter sheet 11 further has at least an elastic strip 114 attached to a right side of the shelter sheet 11 so as to increase the flexibility and degree of extension of the shelter sheet 11. Therefore, the bottom edge of the shelter sheet 11 is able to be further extended to match the longer bottom side of the windshield.

Figure 5:
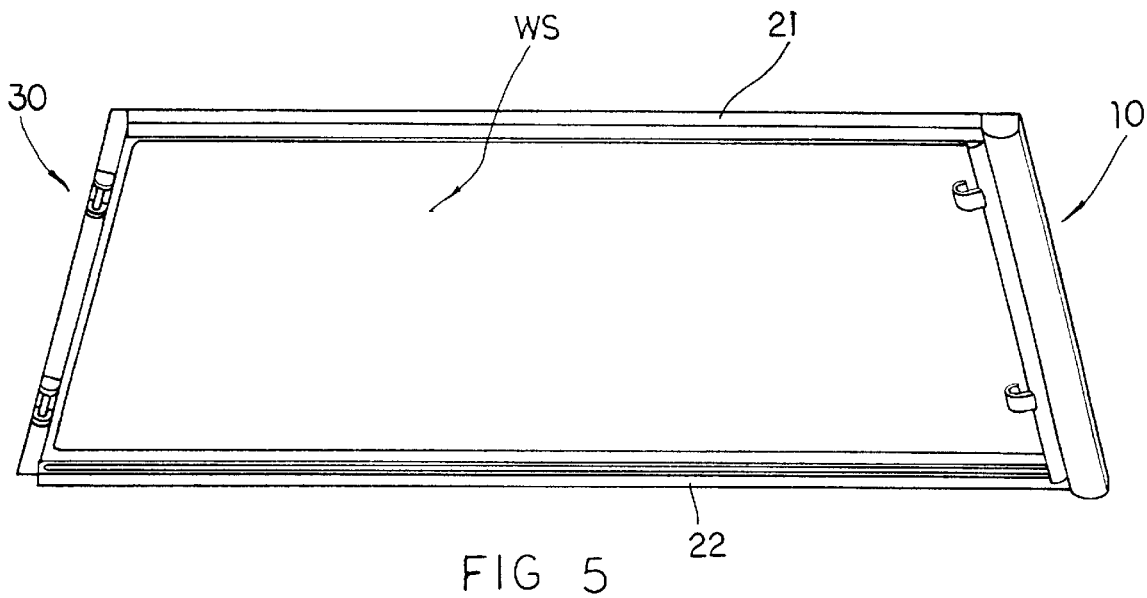
FIG. 5 is a perspective view of a windshield shelter according to an alternative mode of the first preferred embodiment of the present invention, showing the relative positions of a shelter device, a pair of opposite guide tracks, and a fastening means as affixed on the frame of a front windshield of an automobile respectively.

As shown in FIG. 5, an alternative mode of the aforesaid first embodiment is illustrated, in which the shelter device 10, the pair of opposite guide tracks 21, 22, and the fastening means 30 are affixed on the frame of the front windshield WS respectively.

Figure 4:
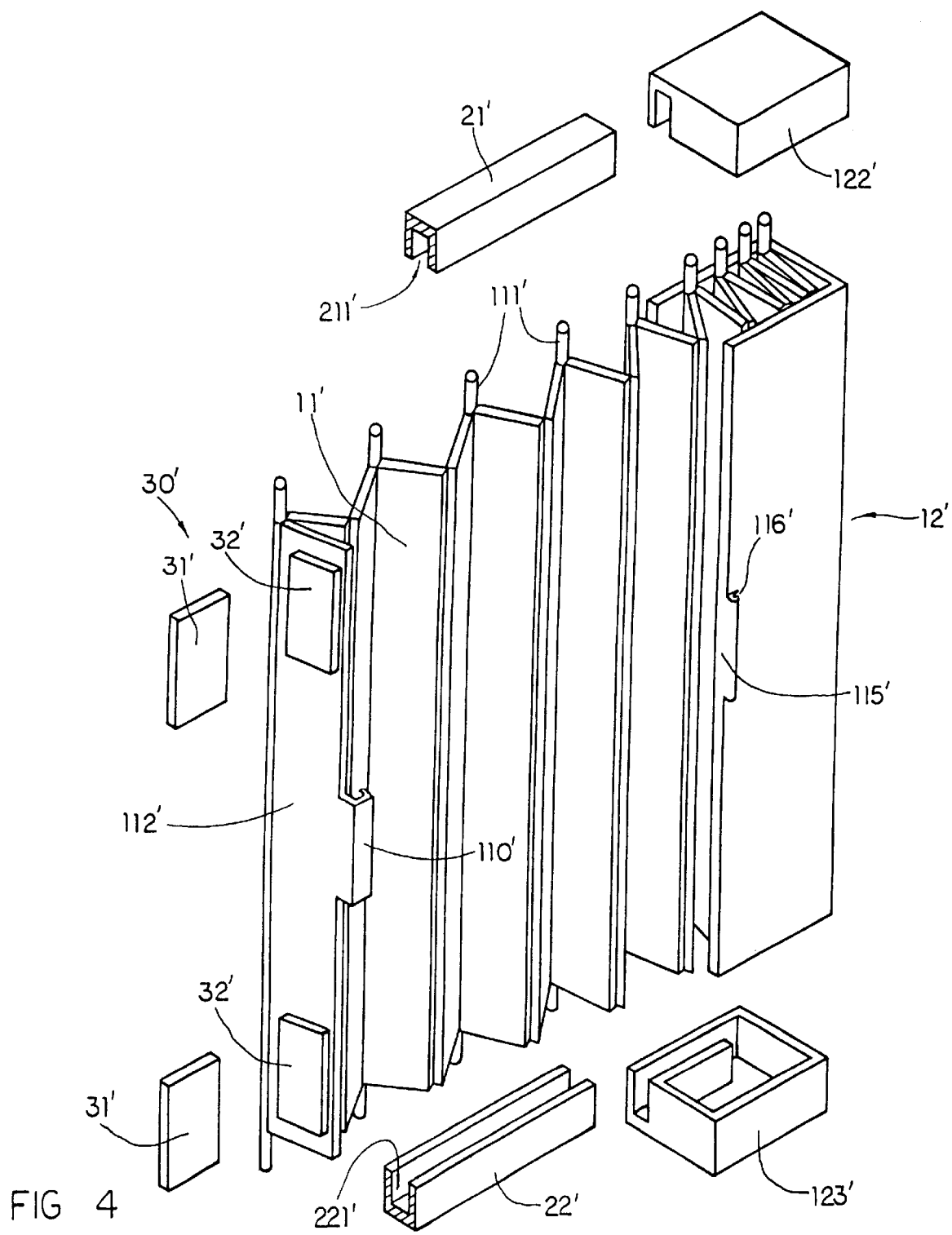
FIG. 4 is a perspective view of a windshield shelter according to a second preferred embodiment of the present invention, showing its folding features, guider pins and magnetic holding means.

As shown in FIG. 4, an alternative mode of a second preferred embodiment of the present invention is illustrated, in which the elongated shelter sheet of the windshield shelter system for shading a windshield of a vehicle is a folding shelter sheet 11'. Such folding shelter sheet 11' is housed in a longitudinal right-angled bracket 12' which has two caps 122', 123' attached to two ends thereof.

In accordance with this second embodiment the guiders of the folding shelter sheet 11' are guider pins 111' and the guiding grooves of the guide tracks 21', 22' are pin grooves 211', 221' to accommodate such guiders 111' for the best result.

A plastic hook like handle 110' is attached to an end strip 112' of the folding shelter sheet 11' and a rigid holder 115' which has a protruding end lip 116' is attached to a front side edge of the bracket 12'. Thus, when the folding shelter sheet 11' is folded to gather within the bracket 12', the handle 110' can be clipped to the lip 116' of the holder 115' so as to fasten the folding shelter sheet 11' within the bracket 121. However, the user can merely pull the handle 110' toward the fourth side of the windshield WS to release the locking relationship between handle 110' of the folding shelter sheet 11' and the holder 115' of the bracket 12'.

Furthermore, as an alternative, the fastening means of the windshield shelter system is a magnetic fastening device 30' which comprises two magnetic holders 31' affixed to the frame of the windshield WS respectively and two magnetic fasteners 32' which are affixed to the free end strip 112' of the folding shelter sheet 11' and adapted to attached with the two corresponding magnetic holders 31' respectively while the folding shelter sheet 11' is fully spread out to shade the entire windshield WS.

In accordance with the specific features provided by the guiding relationship between the guiding tracks and the guiders of the present invention, regardless whether the windshield shelter sheet is folded or not, such windshield shelter system for shading a windshield of a vehicle can be automated with usual auto-control means while those conventional windshield shelters in art can only be manually operated. The incorporating of the present invention with an electric auto-control means can be embodied as follows.

An electrical motor is used to effectuate the transverse movements of the guiders in order to move the shelter sheet to an extended position or a retracted position to achieve the maximum result in convenience. The electrical motor drive shaft can be connected to the spool of the cable that links the guiders by means of a set of pulleys. Thus the rotation of the motor shaft in either direction can drive the shelter sheet simultaneously.

For such an automatic mode of operation, the electric motor can be connected to the battery of the vehicle or alternatively to another separate and independent battery unit specially adapted for this windshield shelter system.

The following are some major advantages of the present invention:

The windshield shelter disclosed in the present invention is convenient in operation, both spreading over the whole windshield while parking and gathering within a housing for viewing while driving. The windshield shelter of the present invention is adapted to install on both the front windshield and/or the rear windshield for covering the entire windshield area so as to shade any direct sunshine through the windshield. Moreover, the extending or gathering of the shelter sheet is guided by means of a pair of guide tracks so as to enable smooth and fast movement of the shelter sheet.

I claim:

1. A windshield shelter for shading a windshield of a vehicle, comprising a shelter device, which is firmly mounted on a first side of said windshield, comprising an elongated shelter sheet and a housing for receiving said shelter sheet therein, said elongated shelter sheet having a size adapted to cover an entire window area of said windshield, wherein said elongated shelter sheet has a plurality of guiders spacingly mounted along two opposite edges of said elongated shelter sheet, each of said guiders has an enlarged guide head protruded perpendicularly to said shelter sheet, said housing comprising a housing tube and a rotatable shaft, said shelter sheet having a first end edge attached to said shaft and being wound around said shaft which is longer than a height of said shelter sheet, said housing tube having a longitudinal slot positioned at one side adjacent to said windshield for enabling a second free end edge of said elongated shelter sheet to be extended out of said housing through said slot, said free end edge of said elongated shelter sheet being bonded with a reinforcing tab which has a diameter larger than a width of said slot, said housing further comprising a pair of caps mounted on two ends of said housing tube, wherein each of said cap has a central sleeve for receiving and supporting two ends of said shaft respectively so that said shaft is rotatably mounted between an axis between said two sleeves, each of said two caps further has a receiving chamber formed around said respective sleeve for receiving said guiders while said shelter sheet is rewound around said shaft within said housing tube, each of said caps further providing a guider mouth slot therethrough at an inner side thereof respectively for said guiders to pass through during an extending and rewinding movement of said elongated shelter sheet, said elongated shelter sheet further having at least an elastic strip attached adjacent to one of said end edges of said elongated shelter sheet so as to increase a flexibility and degree of extension of said elongated shelter sheet;

a pair of identical guide tracks which are firmly attached respectively along a second side and an opposite third side of said windshield for guiding a transverse movement of each of said guiders, each of said guide tracks having an U-shaped cross section and a longitudinal guiding groove which has a bottom enlarged groove portion to receive said enlarged guide heads of said guiders, said two guiding grooves being provided along said two guide tracks respectively and facing each other, so that said guiders of said elongated shelter are perpendicularly inserted into and slid along said corresponding guiding grooves of said pair of guide tracks respectively; and a fastening means comprising at least a holder mounted to a fourth side of said windshield which is opposite to said first side of said windshield, and at least a fastener attached to said free end edge of said elongated shelter sheet, so as to lock said shelter sheet in an entirely extended position to cover said entire window area of said windshield.

2. A windshield shelter as recited in claim 1 in which said guide heads are in ball shape and said bottom groove portions of said guiding grooves are also in ball shape adapted to receive said ball shape guide heads.

3. A windshield shelter as recited in claim 1 in which said holder of said fastening means has a holding rod positioned parallel to said windshield and said fastener of said fastening means is a C-shape hook clip for buckling up said holding rod of said holder.

4. A windshield shelter as recited in claim 2 in which said holder of said fastening means has a holding rod positioned parallel to said windshield and said fastener of said fastening means is a C-shape hook clip for buckling up said holding rod of said holder.

5. A windshield shelter as recited in claim 4 in which there are two holders mounted on an upper and a lower portion of said fourth side of said windshield and two fasteners mounted on an upper and a lower portion of said tab which is embedded by said free end edge of said shelter sheet.

\* \* \* \* \*